United States Patent [19]
Tanaka et al.

[11] Patent Number: 5,386,297
[45] Date of Patent: Jan. 31, 1995

[54] COMBINED OUTPUT SYSTEM FOR CODE DATA AND IMAGE DATA IN A MESSAGE HANDLING PROCESSOR

[75] Inventors: Natsuro Tanaka, Hadano; Tokuji Tamada; Yoshihiro Nakajima, both of Yokohama, all of Japan

[73] Assignees: Hitachi, Ltd., Tokyo; Hitachi Software Engineering Co., Ltd., Yokohama, both of Japan

[21] Appl. No.: 135,752

[22] Filed: Oct. 13, 1993

Related U.S. Application Data

[63] Continuation of Ser. No. 786,308, Nov. 1, 1991, abandoned.

[30] Foreign Application Priority Data

Nov. 1, 1990 [JP] Japan ................. 2-293538

[51] Int. Cl.$^6$ .............................. H04N 1/00
[52] U.S. Cl. ................. 358/402; 358/426; 358/438
[58] Field of Search ........... 358/400, 402, 407, 426, 358/435, 436, 438, 442, 405-406; 382/56; H04N 1/415, 1/00

[56] References Cited

U.S. PATENT DOCUMENTS

| | | | |
|---|---|---|---|
| 4,910,607 | 3/1990 | Kita et al. | 358/400 |
| 5,095,445 | 3/1992 | Sekiguchi | 358/400 |
| 5,146,488 | 9/1992 | Okada et al. | 379/100 |
| 5,155,601 | 10/1992 | Toyama | 358/407 |
| 5,227,893 | 7/1993 | Ett | 358/400 |

FOREIGN PATENT DOCUMENTS 63-276939 of 0000 Japan.
1-292963 11/1989 Japan.

Primary Examiner—Edward L. Coles, Sr.
Assistant Examiner—Kim Yen Vu
Attorney, Agent, or Firm—Kenyon & Kenyon

[57] ABSTRACT

A mail system comprises a message handling processor for storing code data and image data, a code data terminal for generating code data, an image data terminal for generating image data, and a code/image exchange unit for combining the code data and the image data into image data. The message handling processor converts the code data message from the code data terminal to image data by the exchange unit and combines the combined image data and the image data from the image data terminal to produce image data to be outputted to another image data terminal.

8 Claims, 4 Drawing Sheets

COMBINED OUTPUT SYSTEM FOR CODE DATA AND IMAGE DATA IN A MESSAGE HANDLING PROCESSOR

This application is a continuation of application Ser. No. 07/786,308, filed on Nov. 1, 1991 now abandoned.

BACKGROUND OF THE INVENTION

The present invention relates to a combined output system for code data and image data, and more particularly to a combined output system for code data and image data which is suitable for use in a mailing system.

BACKGROUND OF THE INVENTION

A conventional message handling processor is connected to only computer terminals which transmit and receive code data or is connected only to facsimile terminals which transmit and receive image data. A prior technique for such an image configuration system is disclosed in JP-A-1-292963.

SUMMARY OF THE INVENTION

It is an object of the present invention to connect a digital data terminal such as a computer terminal and an image data terminal such as a facsimile terminal to one mailing system.

It is another object of the present invention to provide a mailing system which combines a code data message transmitted from a digital data terminal such as a computer terminal and an image data message transmitted from an image data terminal such as a facsimile terminal into one message and outputs it to another image data terminal such as a facsimile terminal.

In accordance with the present invention, the above objects are achieved by connecting a code/image exchange unit to a message handling processor. The code/image exchange unit has a function of converting a code data message to image data and combining the image data with other image data to enable the combination of a code data message transmitted from a code data terminal, such as a computer terminal, and an image data message transmitted from an image data terminal, such as a facsimile terminal, into one image message and output the combined image message to another image data terminal.

The above objects are further achieved by storing a code data format and an image data format in a memory of the message handling processor, combining code data and image data from terminals and code data and image data in the memory into one image data by designating formats in the memory when data is entered from the terminals and outputting the combined image data to another image data terminal.

When a message is transmitted from the code data terminal, the number or address of the destination image data terminal, the message number of the image data to be transmitted from the image data terminal, the code data format number in the memory of the message handling processor and the image data format number are supplied as address/combination information.

When a message is transmitted from the image data terminal, the destination image data terminal number, the message number of the code data to be transmitted from the code data terminal, the code data format number in the memory of the message handling processor and the image data format number are supplied as the address/combination information.

The message handling processor supplies the code data message and the image data message, and the code data format and the image data format in the memory to the code/image exchange unit in accordance with the address/combination information from the two terminals.

The code/image exchange unit converts the message and the format in the form of code data to image data, synthesizes it to a message and a format in the form of image data, and returns them to the message handling processor.

The image handling processor transmits the synthesized and converted message in the form of image data to an image data terminal corresponding to the address information so that it outputs the image data.

In accordance with the present invention, the code data message transmitted from the code data terminal and the image data message transmitted from the image data terminal are combined into the image data output so that either the code data transmitted from the code data terminal or the image data transmitted from the image data terminal is outputted as one image data.

DETAILED DESCRIPTION

Figure 1:
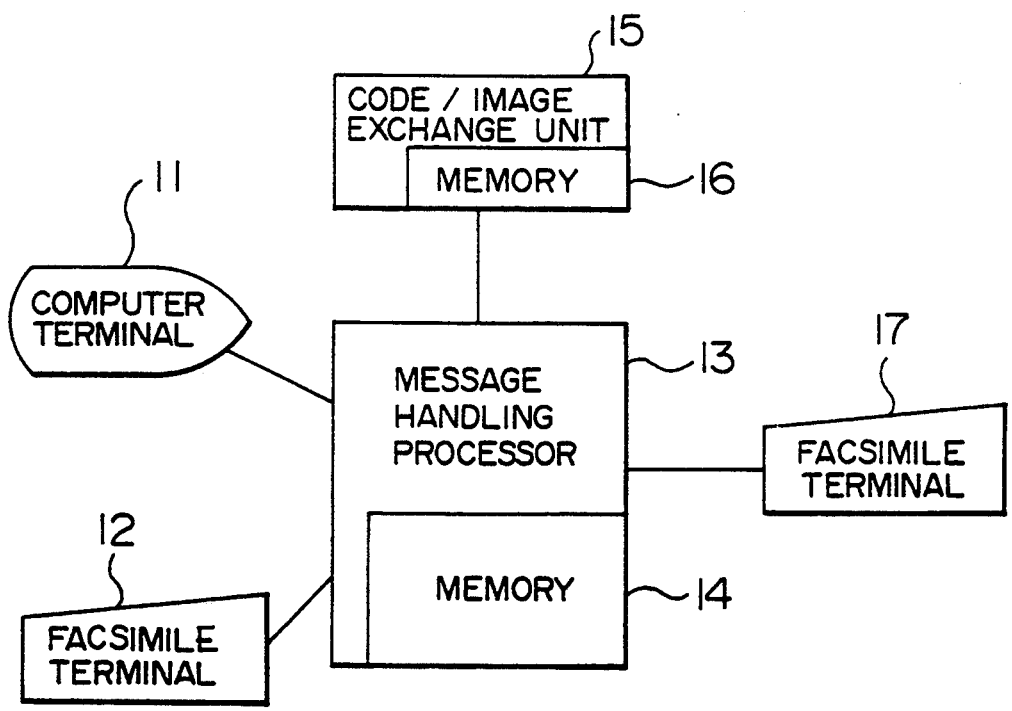
FIG. 1 shows a block diagram of a configuration of one embodiment of the present invention.

In FIG. 1, numeral L1 denotes a computer terminal, numerals 12 and 17 denote facsimile terminals, numeral 13 denotes a message handling processor, numerals 14 and 16 denote memories and numeral 15 denotes a code/image exchange unit.

As shown in FIG. 1, the present embodiment comprises the computer terminal 11 which is a code data terminal, the facsimile terminals 12 and 17 which are image data terminals and the code/image exchange unit 15, all connected to the message handling processor 13.

In the present embodiment, when a message is to be transmitted from the computer terminal 11 or the facsimile terminal 12 to the facsimile terminal 17, the transmitted message is supplied to the code/image handling processor 15 through the message exchange unit 13, the code data is converted to the image data and the image data is synthesized by the code/image exchange unit 15, and they are returned to the message handling processor 13 and transmitted to the facsimile terminal 17.

A code data format and an image data format, which are predetermined formats are stored in the memory 14 of the message handling processor 13. The code data format may include date and time, and the image data format may include a sales slip. They are used when code data from the computer terminal 11 is to be written as an image at a predetermined position of the format.

The code/image exchange unit 15 converts the code data format from the computer terminal 11 and the code data format from the memory 14 of the message handling processor 13 to image data, and combines the image data format from the facsimile terminal 12 and the image data format from the memory 14 of the message handling processor 13 and the image data converted above. It produces a sales slip with predetermined items filled in, date of preparation and a message from the facsimile terminal 12 such as a stamp, a signature and a memo, as output image data. The memory 16 in the code/image exchange unit 15 is used to combine the image data message converted from the code data message by the code/image exchange unit 15 with other image data message.

Figure 2A:
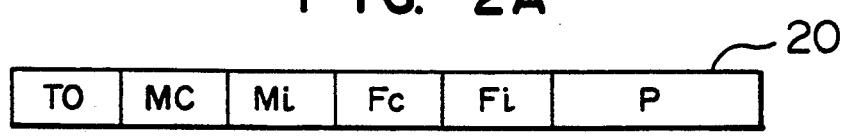
FIGS. 2A and 2B illustrate address/combination information supplied from a computer terminal and a facsimile terminal.
Figure 2B:
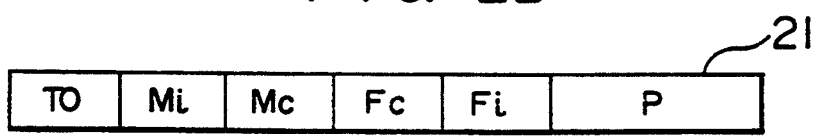

Address/combination information supplied from the computer terminal 11 and facsimile terminal 12 to the message handling processor 13 in order to carry out the above operation are shown in FIGS. 2A and 2B respectively. It is explained below.

In FIG. 2A, TO designates the output facsimile terminal number, or the number of the facsimile terminal 17 in the present embodiment, Mc denotes the message number of the message C (22 in FIG. 3) transmitted from the computer terminal 11, and Mi denotes the message number of the message I (23 in FIG. 3) transmitted from the facsimile 12. Fc denotes the number of the code data format stored in the memory 14 of the message handling processor 13, and Fi denotes the number of the image data format stored in the memory 14. Details thereof will be explained in connection with FIG. 4. P denotes information indicating a positional relationship between the messages C and I, and the image data format and the code data format.

The address/combination information as viewed from the computer terminal 11 indicates that the message C is to be combined with the message I, the code data format and the image data format.

Similarly, FIG. 2B shows address/combination information supplied from the facsimile terminal 12 to the message handling processor 13. The content thereof is identical to that of the address/combination information from the computer terminal 11. The message C, the code data format and the image data format designated by Mc from the computer terminal are messages to be combined with the message I.

Figure 4:
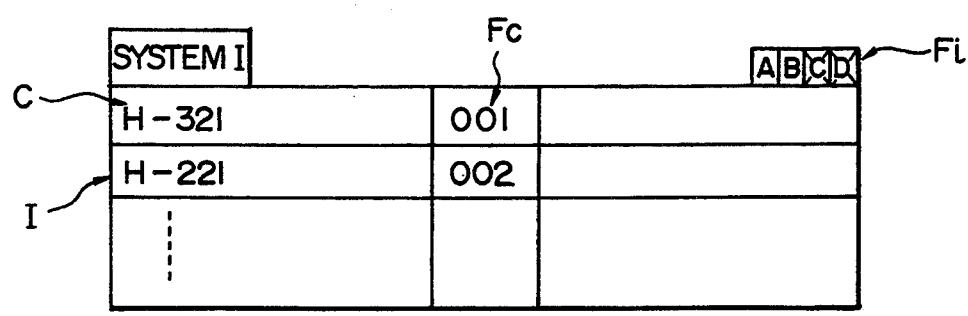
FIG. 4 shows a final message.
Figure 5:
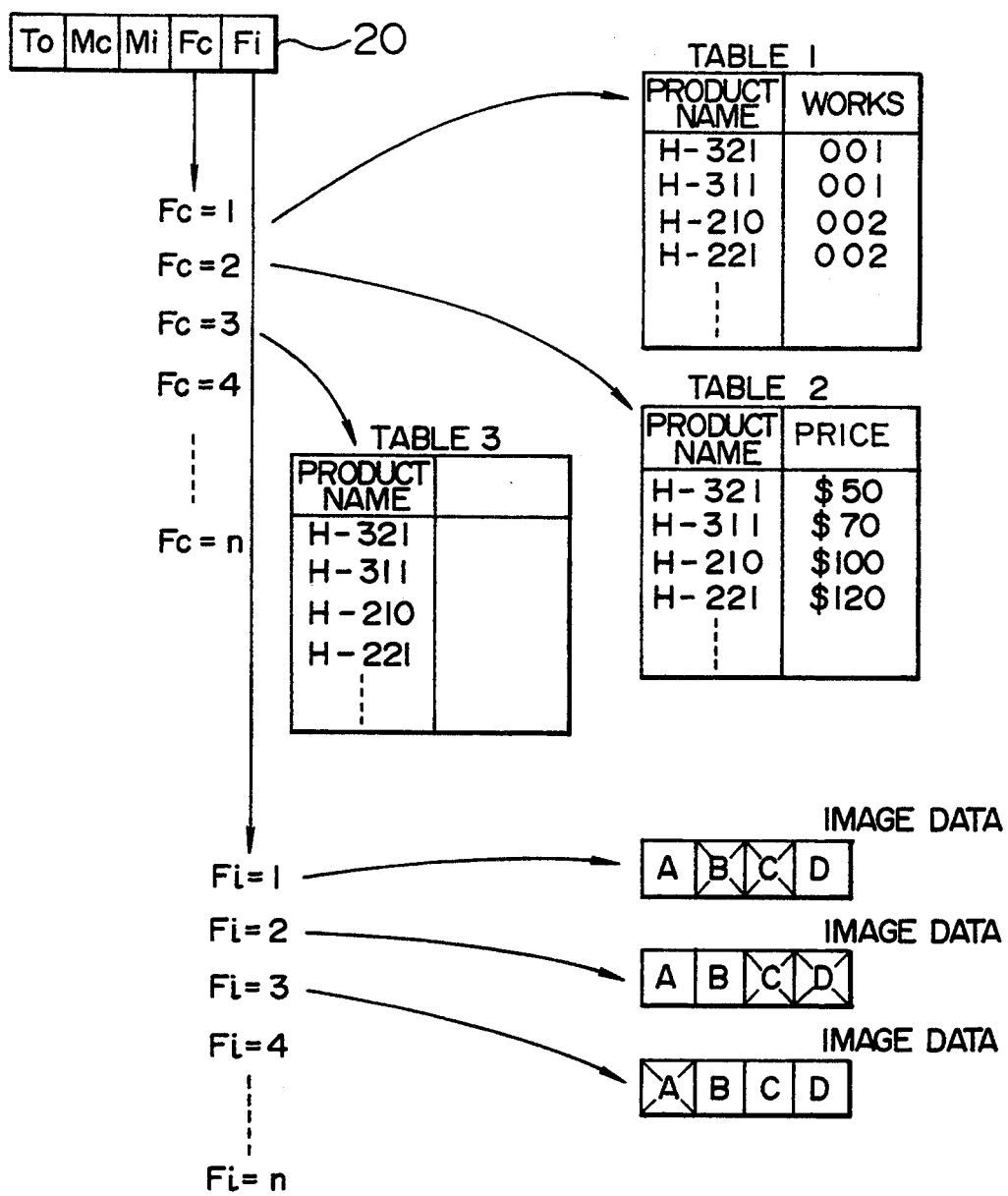
FIG. 5 shows a format.

A process to transmit messages from the computer terminal 11 and the facsimile terminals 12 and combine and convert those message to one message shown in FIG. 4 to supply it to the facsimile terminal 17 is now explained.

The message shown in FIG. 4 is a manufacture order list for a manufacturer to manufacture the system I. In the message, the system I comprises units H-321 and H-221 which are manufactured by plants having code numbers 001 and 002, respectively. For the system I, approvals by departments A and B of the four control departments A, B, C and D of the manufacturer are required.

In the present embodiment, the unit name of the message is entered from the computer terminal as a message C, a frame of the table is entered from the facsimile terminal as the message I, and the plant codes and the control departments designated by Fc and Fi, respectively, are entered from the memory 14.

A procedure to prepare the message of FIG. 4 is explained with reference to FIG. 6.

Figure 3:
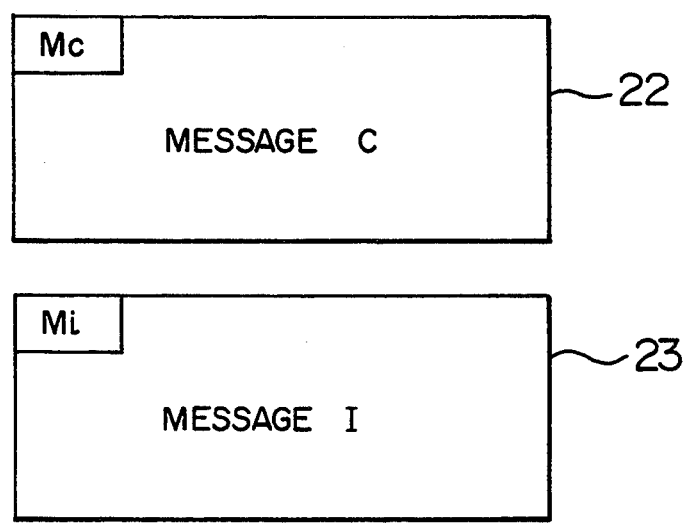
FIG. 3 illustrates a message.

The computer terminal 11 sends the output facsimile address TO, the number Mc of the message which the computer terminal 11 is to transmit, the message number Mi of the image data to be transmitted from the facsimile terminal 12 and combined, the number Fc of the code data format to be combined and the number of the image data format to the message handling processor 13 as the address/combination information, adds the message number Mc to the code data for the unit name shown in FIG. 3, and transmits it as the message C 22.

Figure 6:
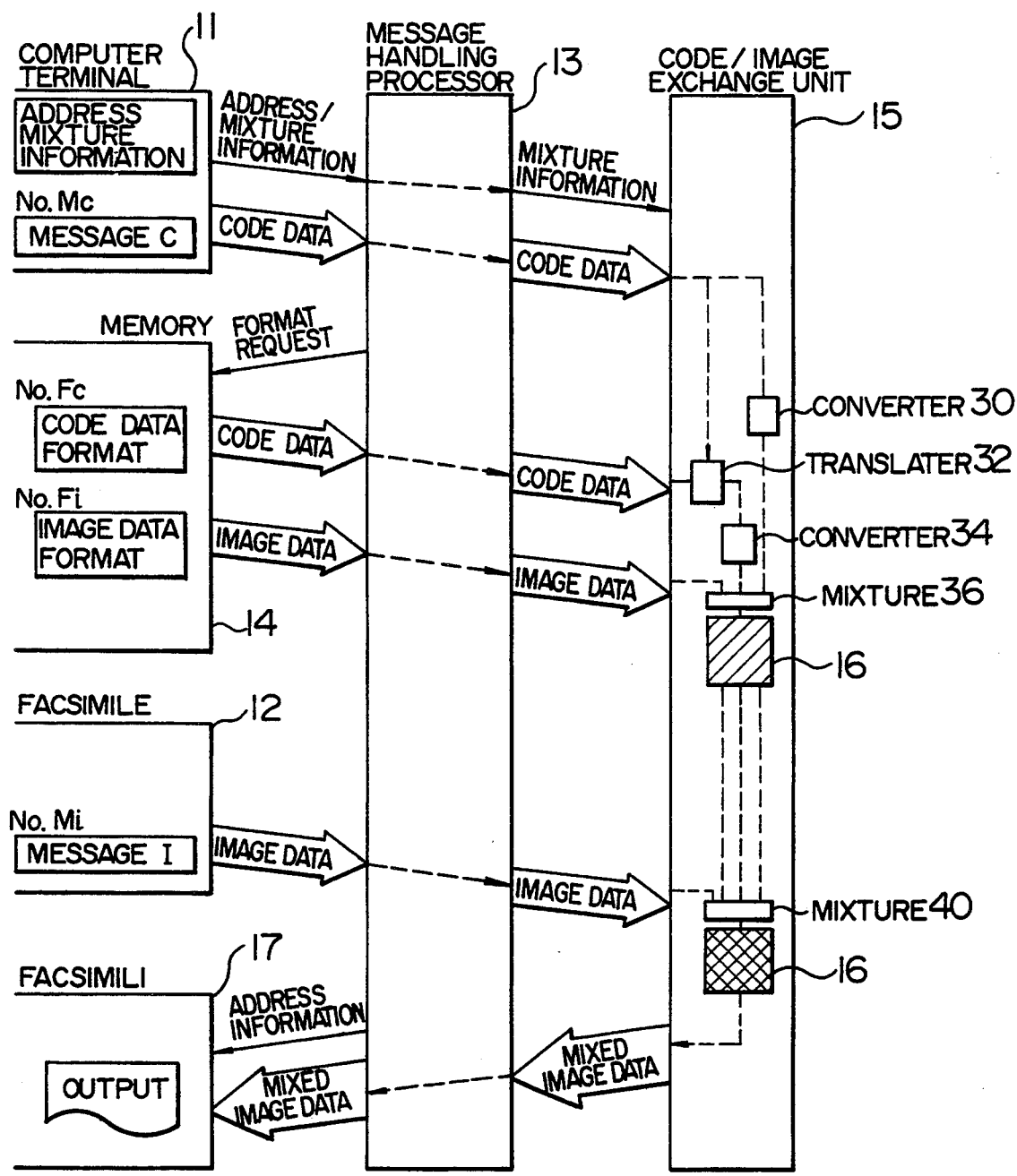
FIG. 6 shows a sequence chart for an exchange process of a code data message, an image data message, a code data format and an image data format.

The message handling processor 13 supplies the message C to the code/image exchange unit 15 as shown in FIG. 6 and requests the code data format at the address Fc and the image data format at the address Fi in the memory 14, supplies those formats to the code/image exchange unit 15, and instructs the data exchange.

When Fc is set to "1", Table 1 which indicates a relation between the unit name and the plant code is selected from Tables 1~n which are code formats in the memory 14. When Fi is set to "2", image formats of the X-marked departments C and D are selected.

The code/image exchange unit 15 converts the code data message C to image data by the converter 30.

Then, the code data format (Table 1) which is the code data is referred to by the converter 32 to get the manufacturing plant code for the unit name in the message C. The plant code is converted to the image data by the converter 34.

The image data format from the memory 14 and the image data from the converters 30 and 34 are combined by the exchange unit at the position designated in accordance with the information P which indicates the positional relationship, and it is stored in the memory 16.

The facsimile terminal 12 receives the frame of the list shown in FIG. 3 as the image data, adds the message number Mi thereto, and transmits it as the message I 23.

The message handling processor 13 supplies the message I 23 to the code/image exchange unit 15. The mixer 40 in the code/image exchange unit 15 combines the message which is the image data and the combined message stored in the memory 16 in accordance with the positional relationship designated by the information P which indicates the positional relationship, and supplies the combined message to the message handling processor 13.

The message handling processor 13 outputs the combined message together with the facsimile number TO which is the address information. The facsimile terminal 17 identified by the address information outputs the combined message from the code/image exchange unit 15.

In the present embodiment, the code data from the computer terminal 11, the image data from the facsimile terminal 12, and the code data format and the image data format stored in the memory 14 of the message handling processor 13 are converted and mixed. Alternatively, a portion of the data may be converted and mixed.

For example, only the code data from the computer terminal 11 may be converted to the image data, or one or both of the code data format and the image data format may be combined thereto.

Further, only the code data from the computer terminal 11 and the image data from the facsimile terminal 12 may be combined to produce image data output, or one of the code data format and the image data format may be combined thereto.

Namely, when the value of Fc or Fi designated by the address/combination information is "0", the format in the memory 14 is not used. In this manner, the format information having non-"0" Fc or Fi, and the messages from the computer terminal and the facsimile terminal are combined.

When the address/combination information is to be transmitted from the facsimile terminal to the message handling processor to combine the messages, the procedure is same as that when the address/combination information is transmitted from the computer terminal.

The address of the terminal to which the address of its own terminal and the messages to be combined are simultaneously transmitted may be added to the address/combination information, and the terminal address as well as the message address may be added to the message. In this case, the message handling processor searches the messages to be combined not merely by the message number but by referring the terminal address, too.

In accordance with the present invention, the code-/image exchange unit converts the code data to the image data and combines it with other image data. Accordingly, the messages may be transmitted from different types of terminal and the messages are automatically combined and supplied to the desired terminal.

What is claimed is:

1. A mailing system comprising:
    a message handling processor capable of storing code data and image data and for transferring data;
    a code data terminal capable of generating code data;
    an image data terminal capable of generating first image data; and
    a code/image exchange unit connected to said message handling processor, said code/image exchange unit including,
        means for converting said code data from said code data terminal into second image data; and
        means for producing third image data to be transferred from said message handling processor to another image data terminal by combining the second image data with said first image data.

2. The mailing system according to claim 1 wherein said message handling processor includes a memory storing a plurality of code data formats for the code data and a plurality of image data formats for the image data and wherein said code/image exchange unit further includes means for converting said code data formats into fourth image data, and wherein said means for producing the third image data includes means for producing said third image data by combining said first image data, said second image data, said fourth image data and said image data format.

3. The mailing system according to claim 2 wherein said code data terminal generates first information designating the first image data, the code data format and the image data format which are to be combined with the code data therefrom and supplies the first information to the message handling processor, and wherein said image data terminal generates second information designating the code data, the code data format and the image data format which are to be combined with the first image data therefrom and supplies the second information to the message handling processor and wherein the message handling processor transfers said code data format, said image data format, said code data from said code data terminal and said image data from said image data terminal which are defined by said first information and said second information, to said code/image exchange unit.

4. A mailing system comprising;
    a code data terminal capable of generating a code-represented message;
    a facsimile terminal capable of generating an image-represented message;
    a memory storing a plurality of code-represented formats and a plurality of image-represented formats;
    said code data terminal generating combination information to designate said image-represented message, said image-represented format and said code-represented format to be combined with said code-represented message;
    an exchange unit capable of receiving the combination information, the image-represented message and the code-represented message, selecting from the memory the code-represented format and the image-represented format designated by the combination information, converting the code-represented message and the code-represented format to image representations, combining the converted code-represented message and format, the image-represented format from the memory and the image-represented message from the facsimile terminal into one image-represented message to be transmitted; and
    other facsimile terminal capable of outputting the transmission message from the exchange unit.

5. The mailing system according to claim 1, wherein said message handling processor includes a memory storing a plurality of code data formats for the code data, and wherein said code/image exchange unit further includes means for converting said code data formats into fourth image data, and wherein said means for producing the third image data comprises means for producing said third image data by combining said first image data, said second image data and said fourth image data.

6. The mailing system according to claim 5, wherein said code data terminal generates first information designating the first image data and the code data format which are to be combined with the code data therefrom and supplies the first information to the message handling processor, and wherein said image data terminal generates second information designating the code data and the code data format which are to be combined with the first image data therefrom and supplies the second information to the message handling processor, and wherein the message handling processor transfers said code data format, said code data from said code data terminal and said first image data from said image data terminal which are defined by said first information and said second information, to said code/image exchange unit.

7. The mailing system according to claim 1, wherein said message handling processor includes a memory storing a plurality of image data formats for the image data, and wherein said means for producing the third image data includes means for producing said third image data by combining said first image data, said second image data and said image data format.

8. The mailing system according to claim 7, wherein said code data terminal generates first information designating the first image data and the image data format which are to be combined with the code data therefrom and supplies the first information to the message handling processor, and wherein said image data terminal generates second information designating the code data and the image data format which are to be combined with the first image data therefrom and supplies the second information to the message handling processor, and wherein the message handling processor transfers said image data format, said code data from said code data terminal and said first image data from said image data terminal which are defined by said first information and said second information, to said code/image exchange unit.

* * * * *

UNITED STATES PATENT AND TRADEMARK OFFICE
CERTIFICATE OF CORRECTION

PATENT NO. : 5,386,297
DATED : 31 January 1995
INVENTOR(S) : Natsuro TANAKA et al.

It is certified that error appears in the above-indentified patent and that said Letters Patent is hereby corrected as shown below:

| Column | Line | |
|---|---|---|
| 2 | 38 | Change "L1" to --11--. |
| 2 | 51-52 | Change "code/image handling processor 15" to --code/image exchange unit 15--. |
| 2 | 52 | Change "exchange unit 13" to --handling processor 13--. |
| 3 | 23 | After "facsimile" insert --terminal--. |
| 3 | 44 | Change "terminals 12" to --terminal 12--. |
| 3 | 45 | Change "message" to --messages--. |
| 5 | 13 | After "referring" insert --to--. |

Signed and Sealed this

Twentieth Day of August, 1996

Attest:

BRUCE LEHMAN

Attesting Officer     Commissioner of Patents and Trademarks